UNITED STATES PATENT OFFICE 2,332,049

PROCESS OF PREPARING ORGANIC SOLVENT-SOLUBLE CELLULOSE DERIVATIVES

Louis H. Bock, Huntingdon Valley, and Alva L. Houk, Philadelphia, Pa., assignors to Röhm & Haas Company, Philadelphia, Pa., a corporation of Delaware No Drawing. Application January 17, 1942, Serial No. 427,206

3 Claims. (Cl. 260—231)

This invention relates to a process for the preparation of organic solvent-soluble derivatives of cellulose. More particularly, this invention deals with a process for preparing nitrogenous ethers of cellulose, containing cyanoethyl groups, by reaction of cellulose and at least two mols of acrylonitrile in the presence of a water-soluble, strongly basic hydroxide.

While it has already been proposed to react unsaturated compounds with cellulose, the nature of the reaction between cellulose and acrylonitrile has not heretofore been determined nor the conditions under which this reaction leads to solvent-soluble products. The nature of the reaction of these two materials cannot be predicted from the behavior of other hydroxyl-containing compounds, particularly in view of the fact that while many hydroxyl-containing compounds react with unsaturated acids and esters, such reaction is not obtained with cellulose in the presence of an alkaline catalyst.

It is now found that cyanoethyl cellulose ether is obtained by reacting between 0° C. and 30° C. cellulose and acrylonitrile in the presence of a water-soluble, strongly basic hydroxide in the form of a 10% to 30% aqueous solution and removing the hydroxide after the initial reaction.

As a cellulosic material for this reaction, there may be used any type of cellulose itself, preferably in fibrous or comminuted form, such as cotton, regenerated cellulose, cellulose pulp from wood, as obtained by removal of lignin and resins therefrom, or linen or other bast fibers.

As the strongly basic, water-soluble hydroxide, there may be used the hydroxide of an alkali metal, such as sodium or potassium hydroxide, a strongly basic quaternary ammonium hydroxide, such as benzyl trimethyl ammonium hydroxide or dibenzyl diethyl ammonium hydroxide, or a mixture of such hydroxides. An aqueous solution containing 10% to 30% of one or more hydroxides is applied to the cellulose, usually in an amount of one-half mol or more of hydroxide per glucose unit of the cellulose. When the upper range of hydroxide concentration is used, it is generally desirable that the temperature be kept in its lower range. To yield a solvent-soluble ether, about two or more mols of acrylonitrile are required and as many as three mols can react per glucose unit of cellulose. Additional amounts of acrylonitrile may be used and are helpful in promoting the reaction. Excess acrylonitrile may in part be recovered when the hydroxide is removed. With excess acrylonitrile, the regulation of other variables becomes less important and the upper limit of temperature and concentration of hydroxide may be used with a minimum loss of cyanoethyl groups. This is probably due to the fact that as the degree of substitution of the cellulose increases, hydrolysis of cyanoethyl groups becomes more difficult. In any case, hydrolysis of the nitrile groups is minimized by removing the alkali as soon as the initial reaction has taken place.

In the reaction of cellulose and acrylonitrile in the presence of aqueous alkali or quaternary ammonium hydroxide, β-cyanoethyl groups replace the hydrogen of the hydroxyl groups of the cellulose in a short time. The reaction is conveniently carried out by mixing cellulose fibers with sufficient hydroxide solution to wet all the fibers. Acrylonitrile is added, preferably gradually, and mixing continued. During the mixing operations, the temperature should be maintained between 0° C. and 30° C. Such operations require only one-half to one hour. As soon as the components have been thoroughly worked together, the alkaline hydroxide is removed, as by neutralizing with an acid, such as dilute acetic, hydrochloric, or sulfuric, or by washing with water. The reaction mixture is then washed with water, filtered, and dried. The dried product swells in acetone and yields solutions in such agents as 70–75% acetic acid, or chloroform. If desired, organic solvent solutions may be prepared and freed from insoluble material by filtering, centrifuging, or like procedure.

The ethers obtained by the procedure described contain about 9% to about 13% of nitrogen, corresponding to about two to about three cyano groups per glucose unit. Such cyanoethyl cellulose ethers may be hydrolyzed upon treatment with alkaline or acid agents and water. These cyanoethyl ethers melt with decomposition at about 225° C. to 240° C. They exhibit a moderate degree of thermoplasticity.

The invention is illustrated by the following examples:

Example 1

17 parts of alpha flock and 40 parts of 20% sodium hydroxide solution were placed in a flask equipped with a stirrer which fitted close to the walls of the flask. The mixture was stirred and 26.5 parts of acrylonitrile was added at 0–10° C. Stirring was continued for three hours at this temperature and then for two hours at 30° C. The mixture was filtered and washed several times with water until free of alkali. It was finally washed with methanol and dried. The product was insoluble in water and in dilute sodium hydroxide solution. The yield was 30 parts. The product contained by analysis 10.09% of nitrogen and yielded at 0.14% of ash. The nitrogen analysis corresponds to 1.93 nitrile groups per glucose unit. The product was soluble in 75% acetic acid and was partly soluble in acetone.

*Example 2*

170 parts of alpha stock and 400 parts of 20% sodium hydroxide were mixed in a Werner-Pfleiderer mixer and cooled to 7° C. 156 parts of acrylonitrile was added with mixing, and mixing was continued for sixteen hours at 7° C. The mixture was washed with water, filtered, and dried at 25° C. The yield was 240 parts of white fibrous material indistinguishable from the starting material in appearance. It was insoluble in water, but swelled in 75% acetic acid and in acetone. Analysis showed the product to contain 9.06% of nitrogen.

*Example 3*

17 parts of alpha flock and 26.7 parts of 30% sodium hydroxide were stirred in a flask with a stirrer which closely fitted the walls of the flask. The mixture was cooled to 7° C., and 26.5 parts of acrylonitrile was added and stirring was continued for sixteen hours at 7° C. The mixture was washed with water, filtered, and dried. The yield was 23.5 parts. The product was shown to contain 8.81% of nitrogen by analysis.

*Example 4*

17 parts of alpha flock and 80 parts of 10% sodium hydroxide were stirred for thirty minutes at 25° C., and 26.5 parts of acrylonitrile was added. Stirring was continued at 25° C. for thirty minutes. The product was washed with water, filtered, and dried. The yield was 22.5 parts.

*Example 5*

170 parts of cotton linters, 400 parts of a 20% solution of benzyl trimethyl ammonium hydroxide, and 265 parts of acrylonitrile were mixed for two hours at 10° C. The mixture was diluted with a large volume of cold water, rinsed with dilute acetic acid, filtered, and dried. A yield of 250 parts of a cyanoethylated cellulose ether was obtained.

By reacting cellulose with at least two mols of acrylonitrile per glucose unit of the cellulose in the presence of a water-soluble, strongly basic hydroxide in a 10% to 30% aqueous solution there is obtained a water-insoluble β-cyanoethyl cellulose ether which swells in many organic solvents and which contains from about two to about three β-cyanoethyl groups per glucose unit. Such ethers may be used as an ingredient in hot melt coatings and in coating compositions containing organic solvents. They may be used for the preparation of films and foils.

We claim:

1. The process of preparing organic solvent-soluble cyanoethyl cellulose ether which comprises reacting cellulose and about two to about three mols of acrylonitrile per glucose unit of the cellulose between 0° and 30° C. in the presence of a water-soluble, strongly basic hydroxide in an aqueous solution of 10% to 30% concentration and removing the hydroxide from the reaction mixture after the initial reaction.

2. The process of preparing organic solvent-soluble cyanoethyl cellulose ether which comprises reacting by mixing cellulose and at least two mols of acrylonitrile per glucose unit of the cellulose between 0° and 30° C. in the presence of a water-soluble, strongly basic hydroxide in an aqueous solution of 10% to 30% concentration and removing the hydroxide from the reaction mixture after the initial reaction.

3. The process of preparing organic solvent-soluble cyanoethyl cellulose ether which comprises reacting cellulose and at least two mols of acrylonitrile per glucose unit of the cellulose between 0° and 30° C. in the presence of a 10% to 30% solution of sodium hydroxide, after the initial reaction neutralizing the sodium hydroxide with an acid, and washing the reaction product with water.

LOUIS H. BOCK.
ALVA L. HOUK.